3,499,026
Patented Mar. 3, 1970

3,499,026
BENZENESULFONYL UREAS
Helmut Weber, Frankfurt am Main, Walter Aumüller, Kelkheim (Taunus), Rudi Weyer, Frankfurt am Main, Karl Muth, Kelkheim (Taunus), and Felix Helmut Schmidt, Mannheim-Neuostheim, Germany, assignors to Farbwerke Hoechst Aktiengesellschaft vormals Meister Lucius & Bruning, Frankfurt am Main, Germany, a corporation of Germany
No Drawing. Filed Nov. 15, 1965, Ser. No. 507,669
Claims priority, application Germany, Nov. 21, 1964, F 44,490
Int. Cl. C07c 149/40, 127/12; A61k 27/00
U.S. Cl. 260—470  15 Claims

ABSTRACT OF THE DISCLOSURE

New benzenesulfonyl-ureas with hypoglycemic properties having the formula:

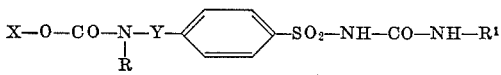

wherein R is hydrogen or lower alkyl, $R^1$ is:

(a) Alkyl or alkenyl having 2 to 8 carbon atoms,
(b) Phenyl-lower alkyl,
(c) Cyclohexyl-lower alkyl,
(d) Endoalkylenecyclohexyl, endoalkylenecyclohexenyl, endoalkylenecyclohexylmethyl or endoalkylenecyclohexenylmethyl having 1 or 2 carbon atoms in the endoalkylene part,
(e) Lower alkylcyclohexyl, lower alkoxycyclohexyl,
(f) Cycloalkyl of 5 to 8 carbon atoms,
(g) Cyclohexenyl or cyclohexenylmethyl;

X is:

(a) Alkyl, alkenyl or haloalkyl containing 1 to 8 carbon atoms,
(b) Phenylalkyl having 1 to 6 alkyl carbon atoms, the phenyl group of which may be substituted and the alkylene chain of which may contain one or several double bonds,
(c) Cycloalkyl containing 3 to 8 carbon atoms and corresponding lower cycloalkyl-alkyls,
(d) Endoalkylenecyclohexyl, endoalkylenecyclohexenyl, endoalkylene-cyclohexylmethyl or endoalkylene-cyclohexenylmethyl containing 1 to 2 endoalkylene carbon atoms,
(e) Lower alkylcyclohexyl, lower alkoxycyclohexyl,
(f) Cyclohexenyl, cyclohexenylmethyl;

Y represents a saturated hydrocarbon chain containing 1 to 4 carbon atoms; and physiologically tolerable salts thereof.

The present invention provides new benzenesulfonyl-ureas corresponding to the formula:

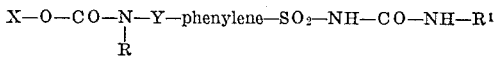

which, in the free form or in the form of their physiologically tolerable salts, possess blood sugar lowering properties and which are distinguished by a strong and particularly long lasting lowering action on the blood sugar level.

In the above formula R represents hydrogen, lower alkyl or lower phenylalkyl, $R^1$ represents:

(a) Alkyl, alkenyl or mercaptoalkyl having 2–8 carbon atoms,
(b) Alkoxyalkyl, alkylmercaptoalkyl or alkylsulfinylalkyl having 4 to 8 carbon atoms of which at least 2 belong to the alkylene part of the alkoxyalkyl, alkylmercaptoalkyl or alkylsulfinylalkyl group,
(c) Lower phenylalkyl, phenylcyclopropyl, (d) Lower cyclohexylalkyl, cycloheptylmethyl, cycloheptylethyl or cyclooctylmethyl,
(e) Endoalkylenecyclohexyl, endoalkylenecyclohexenyl, endoalkylenecyclohexylmethyl or endoalkylenecyclohexenylmethyl having 1 or 2 carbon atoms in the endoalkylene part,
(f) Lower alkylcyclohexyl, lower alkoxycyclohexyl,
(g) Cycloalkyl having 5 to 8 carbon atoms,
(h) Cyclohexenyl, cyclohexenylmethyl,
(i) A heterocyclic ring having 4 to 5 carbon atoms and 1 oxygen atom or 1 sulfur atom and which may have up to 2 ethylenic double bonds or
(k) a heterocyclic ring linked to the adjacent nitrogen atom by means of a methylene group and containing 1 oxygen atom or 1 sulfur atom and which may also contain up to 2 ethylenic double bonds, X represents:

(a) Alkyl, alkenyl or halogenoalkyl containing 1 to 8 carbon atoms,
(b) Alkoxyalkyl or alkylmercaptoalkyl having 3 to 8 carbon atoms of which at least 2 belong to the alkylene part of the alkoxyalkyl or alkylmercaptoalkyl group,
(c) Phenylalkyl having 1 to 6 alkyl carbon atoms, the phenyl group of which may be substituted and the alkylene chain of which may contain 1 or several double bonds,
(d) Cycloalkyl containing 3 to 8 carbon atoms and corresponding lower cycloalkyl-alkyls,
(e) Endoalkylenecyclohexyl, endoalkylenecyclohexenyl, endoalkylene-cyclohexylmethyl or endoalkylene-cyclohexenylmethyl containing 1 to 2 endoalkylene carbon atoms.
(f) Lower alkylcyclohexyl, lower alkoxycyclohexyl,
(g) Cycloalkoxyalkyl or phenoxyalkyl containing 2 to 4 alkyl carbon atoms,
(h) Cyclohexenyl, cyclohexenylmethyl,
(i) A heterocyclic ring linked to the oxygen atom by means of a methylene group and containing 4 to 5 carbon atoms and 1 oxygen atom or 1 sulfur atom and which may also contain up to 2 ethylenic double bonds, Y represents a hydrocarbon chain containing 1 to 4 carbon atoms.

By the term "lower alkyl," there is to be understood a group containing 1 to 4 carbon atoms in a straight or branched chain.

In accordance with the definitions given above R may represent, for example, methyl, ethyl, propyl, isopropyl, butyl, isobutyl, tert. butyl, benzyl, α- or β-phenylethyl, α-, β- or γ-phenylpropyl. Compounds in which R represents methyl or benzyl and, in particular, those in which R represents hydrogen, are preferred.

$R^1$ may represent, for example, ethyl, propyl, isopropyl, butyl, isobutyl, sec. butyl, straight chain or branched amyl (pentyl), hexyl, heptyl or octyl; the groups with an ethylenic double bond corresponding to the above-mentioned alkyl groups, for example, allyl or crotyl, and also alkyl groups containing 2 to 8 carbon atoms and a mercapto group, for example β-mercaptoethyl or higher mercaptoalkyl groups. $R^1$ may also represent, for example, γ-methoxypropyl, δ-methoxy-n-butyl, β-ethoxyethyl, γ-ethoxypropyl, δ-ethoxybutyl or higher alkyloxyethyl, -propyl or -butyl groups, as well as the corresponding groups in which the oxygen atom is replaced by a sulfur atom or the —SO— group. Furthermore, $R^1$ may represent a benzyl, α-phenylethyl, β-phenylethyl, α-, β- or γ-phenylpropyl or phenylbutyl group.

Within the scope of the present invention, there are particularly preferred those compounds which contain, as the group represented by $R^1$, a cycloaliphatic hydrocarbon group which may be substituted by alkyl or alkoxy or linked to the nitrogen atom by means of alkylene. Said groups comprise, for example, cyclopentyl, cycloheptyl, cyclohexyl, cyclooctyl, methlcyclohexyl, ethylcyclohexyl, propyl- and isopropylcyclohexyl, methoxycyclohexyl, ethoxycyclohexyl, propoxy- and isopropoxy-cyclohexyl. The alkyl or alkoxy groups may be in the 2-, 3- or, preferably in the 4-position, in the cis- as well as in the trans-position. Furthermore, there may be mentioned cyclohexylmethyl, α- or β-cyclohexylethyl, cyclohexylpropyl groups, endomethylenecyclohexyl (2,2,1-tricycloheptyl), endoethylenecyclohexyl (2,2,2-tricyclooctyl), endomethylenecyclohexenyl, endoethylenecyclohexenyl, endomethylenecyclohexylmethyl, endoethylenecyclohexylmethyl, endomethylenecyclohexenylmethyl or endoethylenecyclohexenylmethyl, α- or β-phenylcyclopropyl, in the cis- as well as in the trans-form.

Finally, $R^1$ may represent a heterocyclic ring containing 4 to 5 carbon atoms and 1 oxygen atom or 1 sulfur atom and up to 2 ethylene double bonds and which, if desired, may be bound to the adjacent nitrogen atom by means of a methylene group. Examples of such heterocyclic rings are

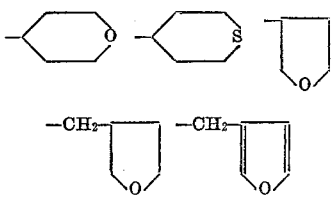

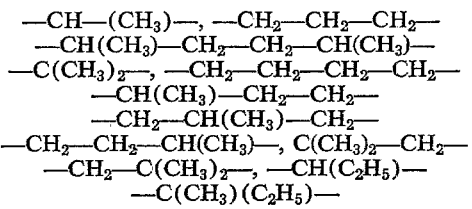

X represents preferably alkyl, cycloalkyl, phenylalkyl, and cycloalkylalkyl groups such as methyl, ethyl, propyl, isopropyl and butyl, isobutyl, sec. butyl, pentyl, hexyl, cyclopentyl, cyclohexyl, cycloheptyl, cyclooctyl, cyclohexylmethyl, benzyl, phenylethyl. The phenylalkyl groups may also be substituted, preferably by low molecular weight alkyl or alkoxy groups, halogen such as chlorine or bromine.

Y represents a hydrocarbon group containing 1 to 4 carbon atoms in a straight or branched chain. Examples of such groups are: —$CH_2$—, —$CH_2$—$CH_2$—

—CH—($CH_3$)—, —$CH_2$—$CH_2$—$CH_2$—
—CH($CH_3$)—$CH_2$—$CH_2$—CH($CH_3$)—
—C($CH_3$)$_2$—, —$CH_2$—$CH_2$—$CH_2$—$CH_2$—
—CH($CH_3$)—$CH_2$—$CH_2$—
—$CH_2$—CH($CH_3$)—$CH_2$—
—$CH_2$—$CH_2$—CH($CH_3$)—, C($CH_3$)$_2$—$CH_2$—
—$CH_2$—C($CH_3$)$_2$—, —CH($C_2H_5$)—
—C($CH_3$)($C_2H_5$)—

The phenylene group indicated in the formula by -phenylene- is preferably unsubstituted; however, it may also be substituted one or several times by halogen, lower alkyl or lower alkoxy. It may contain the remaining parts of the molecule in ortho-, meta-, or para-position to one another, the para-position being preferred.

The benzenesulfonyl-ureas of the present invention can be prepared by methods which are generally used for the preparation of compounds of this class. Thus, they can be prepared by:
(a) reacting benzenesulfonyl isocyanates, benzenesulfonyl carbamic acid esters, benzenesulfonyl thiocarbamic acid esters, benzenesulfonyl carbamic acid halides or benzenesulfonyl ureas carrying the substituent:

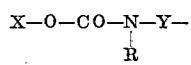

with $R^1$-substituted amines or with salts thereof, or
(b) reacting benzenesulfonamides or their salts carrying the substituent:

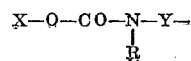

with $R^1$-substituted isocyanates, carbamic acid esters, thiocarbamic acid esters, carbamic acid halides or ureas, or
(c) reacting benzenesulfonyl chlorides carrying the substituent:

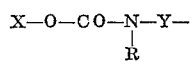

with $R^1$-substituted ureas, isourea ethers, isothiourea ethers or parabanic acids and hydrolysing the benzenesulfonyl isourea ethers, benzenesulfonyl isothiourea ethers or benzenesulfonyl parabanic acids so obtained in this way or by another method, or
(d) replacing the sulfur atom in correspondingly substituted benzenesulfonyl thioureas by an oxygen atom, or
(e) oxidizing correspondingly substituted benzenesulfenyl ureas or benzenesulfinyl ureas, or
(f) introducing the radical:

in one or several reaction stages into benzenesulfonyl ureas of the formula:

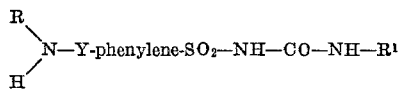

and, if desired, converting a resulting free compound into a salt thereof by treatment with an alkaline agent.

Depending on the nature of the groups X and $R^1$, it may occur in some cases that one or the other of the above-mentioned processes is less suitable for the preparation of individual compounds which correspond to the general formula or, at least, that it requires measures for the protection of the active groups. Such cases, however, which are relatively rare, can easily be recognized by the expert to whom it will make no difficulty to use with success another of the above-described methods.

The benzenesulfonyl-carbamic acid esters or benzenesulfonyl-thiocarbamic acid esters may carry in the alcohol component a low molecular weight alkyl group or a phenyl group. The same applies to the $R^1$-substituted carbamic acid esters or the corresponding mono-thiocarbamic acid esters.

As carbamic acid halides the chlorides are advantageously used.

The benzenesulfonyl ureas used as starting substances in the process of the present invention may be unsubstituted at the side of the urea molecule opposite to the sulfonyl group or may be substituted once or twice by preferably low molecular weight alkyl or aryl radicals; the aryl groups may be linked with one another by a chemical bond or by means of bridging member such as —$CH_2$—, —NH—, —O— or —S—. Instead of benzenesulfonyl ureas substituted in such manner, there may also be used corresponding N-benzenesulfonyl-N'-acyl-ureas, which in addition may be alkylated or arylated at the N'-nitrogen atom, and even bis-(benzenesulfonyl)-ureas. Such bis-(benzenesulfonyl)-ureas or N-benzenesulfonyl-N'-acyl ureas may be treated, for example, with $R^1NH_2$ amines. The salts so obtained are then heated to elevated temperatures, especially a temperature above 100° C.

It is also possible to start from ureas of the formula $R^1$—NH—CO—$NH_2$ or from acylated ureas of the formula $R^1$—NH—CO—NH—acyl, in which acyl represents a preferably low molecular weight aliphatic or aromatic acid group or the nitro group, or from phenyl-ureas of the formula $R^1$—NH—CO—NH—$C_6H_5$ or from diphenyl-ureas of the formula $R^1$—NH—CO—N($C_6H_5$)$_2$, in which the phenyl groups may be substituted and may be linked with one another directly or by means of a bridge member such as —CH₂—, —NH—, —O— or —S—, or from N,N-disubstituted ureas of the formula $$R^1-NH-CO-NH-R^1$$

and to react the said compounds with $$X-O-CO-N-Y$$
$$\phantom{X-O-CO-N}|$$
$$\phantom{X-O-CO-N-}R$$

substituted benzenesulfonamides.

In the correspondingly substituted benzenesulfonyl thioureas the sulfur atom can be replaced by an oxygen atom, for example, with the aid of oxides or salts of heavy metals or by the use of oxidizing agents such as hydrogen peroxide, sodium peroxide or nitrous acid. The thioureas can likewise be desulfurized by treatment with phosgene or phosphorus pentachloride. Chloroformic acid amidines or chloroformic acid carbodiimides obtained as intermediates can be converted into the benzenesulfonylureas by an appropriate treatment, for example, by hydrolysis or the addition of water.

The introduction of the group X—O—CO— is advantageously realised by reacting the aminoalkyl-benzenesulfonyl-ureas with corresponding chlorocarbonic acid esters or with a reactive derivative of this acid (orthocarbonic acid). It is also possible first to treat the said aminoalkyl-benzenesulfonyl-ureas with phosgene and then to react the carbamic acid chlorides or isocyanates so obtained with a corresponding alcohol.

As regards the reaction conditions, the manner of carrying out the process of the present invention may, in general, vary within wide limits and can be adapted to each individual case. For example, the reactions can be carried out with the use of solvents, at room temperature or at an elevated temperature.

The benzenesulfonyl-urea derivatives obtained by the process of the present invention are valuable medicaments which are distinguished by a strong and long lasting hypoglycemic action. Their blood sugar lowering action can be ascertained by feeding them, for example, to rabbits in a dose of 10 milligrams/kilogram of body weight and determining the blood sugar value according to the known method of Hagedorn-Jensen or by means of an autoanalyzer.

Thus, it has been found that N-[4-(β-carbobenzoxyamido - ethyl)-benzenesulfonyl]-N'-cyclohexyl-urea provokes after 3 hours a lowering of the blood sugar of 30% and that N-[4-(β-carbomethoxyamido-ethyl)-benzenesulfonyl]-N'-cyclohexyl-urea provokes after 3 hours a lowering of the blood sugar of 37%. In contradistinction thereto, N-(4-methyl-benzenesulfonyl) - N' - butyl-urea which is known as an oral antidiabetic and is used all over the world as medicament, has no blood sugar lowering properties when fed to rabbits in doses of less than 25 milligram/kilogram of body weight.

The strong action of the compounds according to the present invention becomes more evident when the dose is further reduced. When N - [4-(β-carbobenzoxyamido-ethyl)-benzenesulfonyl] - N' - cyclohexyl-urea is administered in a dose of 0.2 milligram/kilogram or N-[4-(β-carbomethoxyamido-ethyl)-benzenesulfonyl] - N' - (4-methyl-cyclohexyl)-urea is administered in a dose of 0.3 milligram/kilogram or N - [4 - (β-carbethoxy-amido-ethyl)-benzenesulfonyl] - N' - (4-methyl-cyclohexyl)-urea is administered in a dose of 0.1 milligram/kilogram, a distinct lowering of the blood sugar level can still be observed.

The benzenesulfonyl-ureas described are preferably used for the manufacture of orally administerable preparations having blood sugar level lowering action for the treatment of diabetes mellitus and may be used as such or in the form of their salts or in the presence of substances which cause such salt formation. For the formation of salts, there may be used, for example, alkaline agents such as alkali metal hydroxides or alkaline earth metal hydroxides, alkali metal carbonates or bicarbonates, or alkaline earth metal carbonates or bicarbonates, but also organic bases, in particular tertiary nitrogen bases, provided that they are physiologically tolerable.

The pharmaceutical preparations are advantageously in the form of tablets containing, in addition to the products of the invention, the usual adjuvants and carriers, for example, talc, starch, lactose, tragacanth or magnesium stearate.

A pharmaceutical preparation containing one of the aforesaid benzensulfonyl-ureas as active substance, for example a tablet or a powder, with or without the aforesaid additives, is advantageously brought into a suitable unit dosage form. The dose chosen should comply with the activity of the benzenesulfonyl-urea used and the desired effect. Advantageously, the dosage per unit amounts to about 0.5 to 100 milligrams, preferably 2 to 10 milligrams, but considerably higher or lower dosage units may also be used, which, if desired, are divided or multiplied prior to their administration.

The following examples illustrate the invention but they are not intended to limit it thereto:

EXAMPLE 1

N-[4-(β-carbethoxyamido-ethyl)-beneznesulfonyl]-N'-(4-methylcyclohexyl)-urea (trans)

13.6 grams of 4-(β-carbethoxyamido-ethyl)-benzenesulfonamide (melting point 162–164° C.) were dissolved in 25 milliliters of 2 N sodium hydroxide solution and 50 milliliters of acetone and to this solution were added dropwise, while stirring, at 0–5° C., 7 g. of 4-methylcyclohexylisocyanate (trans). The whole was further stirred for 3 hours, diluted with water and a small amount of methanol, filtered and the filtrate was acidified. The N-[4-(β-carbethoxyamido - ethyl) - benzenesulfonyl] N' - (4-methyl-cyclohexyl)-urea which precipitated in crystalline form was found to melt at 186–188° C. (after recrystallization from methanol).

In analogous manner there were obtained:

N-[4-(β-carbethoxyamido-ethyl)-benzenesulfonyl]-N'-cyclohexyl-urea, melting point 165–167° C. (from methanol) and N-[4-(β-carbethoxyamido-ethyl)-benzenesulfonyl]-N'-(4-ethyl-cyclohexyl)-urea (trans), melting point 169–170° C. (from methanol); from 4-(β-carbomethoxyamido-ethyl)-benzenesulfonamide (melting point 175–176° C.)

N-[4-(β-carbomethoxyamido-ethyl)-benzenesulfonyl]-N'-cyclohexyl-urea, melting point 170–171° C. (from methanol), N-[4-(β-carbomethoxyamido-ethyl)-benzenesulfonyl]-N'-butyl-urea, melting point 147–148.5° C. (from methanol), N-[4-(β-carbomethoxyamido-ethyl)-benzenesulfonyl]-N'-(4-methylcyclohexyl)-urea (trans), melting point 172–174° C. and N-[4-(β-carbomethoxyamido-ethyl)-benzenesulfonyl]-N'-(4-ethylcyclohexyl)-urea (trans), melting point 178–180° C.; from N-(β-n-carbobutoxyamido-ethyl)-benzensulfonamide (melting point 122–124° C.)

N-[4-(β-n-carbobutoxyamido-ethyl)-benzenesulfonyl]-N'-cyclohexyl-urea, melting point 125–127° C. (from methanol) and N-[4-(β-n-carbobutoxyamido-ethyl)-benzenesulfonyl]-N'-(4-methylcyclohexyl)-urea (trans), melting point 150–151° C. (from methanol); from 4-(β-carbobenzoxyamido-ethyl)-benzenesulfonamide (melting point 157–158° C.)

N-[4-(β-carbobenzoxyamido-ethyl)-benzenesulfonyl]-N'-cyclohexyl-urea, melting point 170–171° C. (from methanol), N-[4-(β-carbobenzoxyamido-ethyl)-benzenesulfonyl]-N'-butyl-urea, melting point 120–122° C. (from methanol) and N-[4-(β-carbobenzoxyamido-ethyl)-benzenesulfonyl]-N'-(4-methylcyclohexyl)-urea, melting point 178–180° C. (from methanol); from 4-(carbobenzoxyamido-methyl)-benzenesulfonamide (melting point 155–156° C.)

N-[4-(carbobenzoxyamido-methyl)-benzenesulfonyl]-N'-cyclohexyl-urea, melting point 170–171° C. (from methanol), N-[4-(carbobenzoxyamido-methyl)-benzenesulfonyl]-N'-(4-methylcyclohexyl)-urea (trans), melting point 185–186° C. (from methanol) and N-[4-carbobenzoxyamido-methyl)-benzenesulfonyl]-N'-(4-ethylcyclohexyl)-urea (trans), melting point 184–186° C. (from methanol); from 4-(β-carbisopropoxyamido-ethyl)-benzenesulfonamide (melting point 191–192° C.)

N-[4-(β-carbisopropoxyamido-ethyl)-benzenesulfonyl]-N'-cyclohexyl-urea, melting point 180.5–181° C. (from methanol), N-[4-(β-carbisopropoxyamido-ethyl)-benzenesulfonyl]-N'-butyl-urea, melting point 156–157° C. (from methanol), N-[4-(β-carbisopropoxyamido-ethyl)-benzenesulfonyl]-N'-(4-methylcyclohexyl)-urea (trans), melting point 161–162° C. (from methanol), and N-[4-(β-carbisopropoxyamido-ethyl)-benzenesulfonyl]-N'-(4-ethylcyclohexyl)-urea (trans), melting point 166–168° C. (from methanol); from 4-(β-carbisoamyloxyamido-ethyl)-benzenesulfonamide (melting point 104–106° C.)

N-[4-(β-carbisoamyloxyamido-ethyl)-benzensulfonyl]-N'-cyclohexyl-urea, melting point 132–134° C. (from methanol), and N-[4-(β-carbisoamyloxyamido-ethyl)-benzenesulfonyl]-N'-(4-methylcyclohexyl)-urea (trans), melting point 152–154° C. (from methanol); from 4-(γ-carbethoxyamido-propyl)-benzenesulfonamide (melting point 96° C.)

N-[4-(γ-carbethoxyamido-propyl)-benzenesulfonyl]-N'-cyclohexyl-urea, melting point 118–120° C. (from ethanol); from 4-(β-<n-propoxycarbonamido>-ethyl-benzenesulfonamide (melting point 140–142° C.)

N-[4-(β-<n-propoxycarbonamido>-ethyl-benzenesulfonyl]-N'-(methoxycyclohexyl)-urea, melting point 132–134° C. (from methanol/water; from 4-(β-<isobutoxycarbonamido>-ethyl)-benzenesulfonamide (melting point 137–139° C.)

N-[4-(β-<isobutoxycarbonamido>-ethyl)-benzenesulfonyl]-N'-cyclohexyl-urea, melting point 145–147° C. (from methanol), and N-[4-(β-<isobutoxycarbonamido>-ethyl)-benzenesulfonyl]-N'-(4-methylcyclohexyl)-urea (trans), melting point 148–150° C. (from methanol); from 4-(β-<allyloxycarbonamido>-ethyl)-benzenesulfonamide (melting point 145–147° C.)

N-[4-(β-<allyloxycarbonamido>-ethyl)-benzenesulfonyl]-N'-cyclohexyl-urea, melting point 147–149° C. (from methanol), N-[4-(β-<allyloxycarbonamido>-ethyl)-benzenesulfonyl]-N'-(4-methylcyclohexyl)-urea (trans), melting point 141–143° C. (from methanol), and N-[4-(β-<allyloxycarbonamido>-ethyl)-benzenesulfonyl]-N'-(4-ethylcyclohexyl)-urea (trans), melting point 145–147° C. (from methanol); from 4-(β-<cyclohexyloxycarbonamido>-ethyl)-benzenesulfonamide (melting point 146–148° C.)

N-[4-(β-<cyclohexyloxycarbonamido>-ethyl)-benzenesulfonyl]-N'-cyclohexyl-urea, melting point 151–152° C. (from methanol), N-[4-(β-<cyclohexyloxycarbonamido>-ethyl)-benzenesulfonyl]-N'-(4-methylcyclohexyl)-urea (trans), melting point 172–174° C. (from methanol), and N-[4-(β-<cyclohexyloxycarbonamido>-ethyl)-benzenesulfonyl]-N'-(4-ethylcyclohexyl)-urea (trans), melting point 173–175° C. (from methanol); from 4-(β-<β-phenylethoxycarbonamido>-ethyl)-benzenesulfonamide (melting point 103–105° C.)

N-[4-(β-<β-phenylethoxycarbonamido>-ethyl)-benzenesulfonyl]-N'-cyclohexyl-urea, melting point 176–178° C. (from methanol), N-[4-(β-<β-phenylethoxycarbonamido>-ethyl)-benzenesulfonyl]-N'-butyl-urea, melting point 148–150° C. (from methanol), and N-[4-(β-<β-phenylethoxycarbonamido>-ethyl)-benzenesulfonyl]-N'-(4-methylcyclohexyl)-urea (trans), melting point 183–185° C. (from methanol); from 4-(β-<γ-phenylpropoxycarbonamido>-ethyl)-benzenesulfonamide (melting point 152–153° C.)

N-[4-(β-<γ-phenylpropoxycarbonamido>-ethyl)-benzenesulfonyl]-N'-cyclohexyl-urea, melting point 151–153° C. (from methanol), N-[4-(β-<γ-phenylpropoxycarbonamido>-ethyl)-benzenesulfonyl]-N'-(4-methylcyclohexyl)-urea (trans), melting point 155–157° C. (from methanol), and N-[4-(β-<γ-phenylpropoxycarbonamido>-ethyl)-benzenesulfonyl]-N'-(4-ethylcyclohexyl)-urea (trans), melting point 158–160° C. (from methanol); from 4-(β-<4-chlorobenzyloxycarbonamido>-ethyl)-benzenesulfonamide (melting point 163–165° C.)

N-[4-(β-<4-chlorobenzyloxycarbonamido>-ethyl)-benzenesulfonyl]-N'-cyclohexyl-urea, melting point 167–168° C. (from methanol), N-[4-(β-<4-chlorobenzyloxycarbonamido>-ethyl)-benzenesulfonyl]-N'-butyl-urea, melting point 160–162° C. (from methanol), N-[4-(β-<4-chlorobenzyloxycarbonamido>-ethyl)-benzenesulfonyl]-N'-(4-methylcyclohexyl)-urea (trans), melting point 196–197° C. (from methanol), and N-[4-(β-<4-chlorobenzyloxycarbonamido>-ethyl)-benzenesulfonyl]-N'-(4-ethylcyclohexyl)-urea (trans), melting point 191–192° C. (from methanol); from 4-(β-<2-chlorobenzyloxycarbonamido>-ethyl)-benzenesulfonamide (melting point 134–136° C.)

N-[4-(β-<2-chlorobenzyloxycarbonamido>-ethyl)-benzenesulfonyl]-N'-cyclohexyl-urea, melting point 154–156° C. (from methanol), and N-[4-(β-<2-chlorobenzyloxycarbonamido>-ethyl)-benzenesulfonyl]-N'-(4-methylcyclohexyl)-urea (trans), melting point 181–183° C. (from methanol); from 4-(β-<4-isopropylbenzyloxycarbonamido>-ethyl)-benzenesulfonamide (melting point 143–145° C.)

N-[4-(β-<4-isopropylbenzyloxycarbonamido>-ethyl)-benzenesulfonyl]-N'-cyclohexyl-urea, melting point 157–158° C. (from methanol), N-[4-(β-<4-isopropylbenzyloxycarbonamido>-ethyl)-benzenesulfonyl]-N'-butyl-urea, melting point 146–148° C. (from methanol), and N-[4-(β-<4-isopropylbenzyloxycarbonamido>-ethyl)-benzenesulfonyl]-N'-(4-methylcyclohexyl)-urea, melting point 156–158° C. (from methanol); from 4-(β-<3,4-dichlorobenzyloxycarbonamido>-ethyl)-benzenesulfonamide (melting point 129–131° C.)

N-[4-(β-<3,4-dichlorobenzyloxycarbonamido>-ethyl)-benzenesulfonyl]-N'-cyclohexyl-urea, melting point 169–171° C. (from methanol), and N-[4-(β-<3,4-dichlorobenzyloxycarbonamido>-ethyl)-benzenesulfonyl]-N'-(4-methylcyclohexyl)-urea (trans), melting point 170–172° C. (from methanol); from 4-(β-<4-methylcyclohexyloxycarbonamido>-ethyl)-benzenesulfonamide (melting point 162–164° C.)

N-[4-(β-<4-methylcyclohexyloxycarbonamido>-ethyl)-benzenesulfonyl]-N'-cyclohexyl-urea, melting point 170–172° C. (from methanol), N-[4-(β-<4-methylcyclohexyloxycarbonamido>-ethyl)-benzenesulfonyl]-N'-(4-methylcyclohexyl)-urea (trans), melting point 183–185° C. (from methanol), and N-[4-(β-<4-methylcyclohexyloxycarbonamido>-ethyl)- benzenesulfonyl]-N'-butyl-urea, melting point 166–167° C. (from methanol); from 4-(β-<diethylmethoxycarbonamido>-ethyl)-benzenesulfonamide (melting point 113–115° C.)

N-[4-(β-<diethylmethoxycarbonamido>-ethyl)-benzenesulfonyl]-N'-cyclohexyl-urea, melting point 184–185° C. (from methanol), and N-[4-(β-<diethylmethoxycarbonamido>-ethyl)-benzenesulfonyl]-N'-(4-methylcyclohexyl)-urea (trans), melting point 171–173° C. (from methanol); from 4-(β-<β-chloroethoxycarbonamido>-ethyl)-benzenesulfonamide (melting point 110° C.)

N-[4-(β-<β-chloroethoxycarbonamido>-ethyl)-benzenesulfonyl]-N'-cyclohexyl-urea, melting point 143–145° C. (from methanol), and N-[4-(β-<β-chloroethoxycarbonamido>-ethyl)-benzenesulfonyl]-N'-(4-methylcyclohexyl)-urea (trans), melting point 171–173° C. (from methanol); from 4-(β-<N-methylethoxycarbonamido>-ethyl)-benzenesulfonamide (melting point 114–116° C.)

N-[4-(β-<N-methylethoxycarbonamido>-ethyl)-benzenesulfonyl]-N'-cyclohexyl-urea, melting point 90–92° C. (from methanol), and N-[4-(β-<N-methylethoxycarbonamido>-ethyl)-benzenesulfonyl]-N'-(4-methylcyclohexyl)-urea (trans), melting point 98–100° C. (from methanol); from 4-(β-<4-methylbenzyloxycarbonamido>-ethyl)-benzenesulfonamide (melting point 173–174° C.)

N-[4-(β-<4-methylbenzyloxycarbonamido>-ethyl)-benzenesulfonyl]-N''-cyclohexyl-urea, melting point 173–174° C. (from methanol), and N-[4-(β-<4-methylbenzyloxycarbonamido>-ethyl)-benzenesulfonyl]-N'-(4-methylcyclohexyl)-urea (trans), melting point 180–181° C. (from methanol).

EXAMPLE 2

N-[4 - β-carbopropoxyamido - ethyl) - benzenesulfonyl]-N'-cyclohexyl-urea 1 gram of cyclohexylamine were added to 3.5 grams of N-[4 - (β - carbopropoxyamido-ethyl) - benzenesulfonyl]-methylurethane (melting point 118–119° C.) in 10 milliliters of toluene and the whole was then heated for 1 hour to 120–130° C., the methanol formed distilling off. The crystallized product was filtered with suction and recrystallized from methanol. The melting point of the N - [4 - (β-carbopropoxyamido-ethyl)-benzenesulfonyl]-N'-cyclohexyl-urea was at 142–144° C.

In analogous manner there were obtained:

N - [4 - (β-carbopropoxyamido-ethyl)-benzenesulfonyl]-N'-butyl-urea, melting point 132–135° C. (from methanol), N - [4 - (β-carbopropoxyamido-ethyl)-benzenesulfonyl]-N'-(4-methylcyclohexyl)-urea (trans), melting point 156–158° C. (from methanal), and N - [4 - (β-carbopropoxyamido-ethyl)-benzenesulfonyl]-N'-(4-ethylcyclohexyl)-urea (trans), melting point 161–164° C. (from methanol); from N-[β-4-(β-<isobutoxycarbonamido>-ethyl)-benzenesulfonyl]-methylurethane (melting point 117–119° C.)

N - [4 - (β-<isobutoxycarbonamido>-ethyl)-benzenesulfonyl]-N'-(β-phenylethyl)-urea, melting point 142–144° C. (from methanol), N - [4 - (β-<isobutoxycarbonamido>-ethyl)-benzenesulfonyl-N'-cyclohexylmethyl-urea, melting point 154–156° C. (from methanol), and N - [4 - (β-<isobutoxycarbonamido>-ethyl)-benzenesulfonyl]-N'-n-hexyl-urea, melting point 140–142° C. (from methanol).

EXAMPLE 3

N - [4 - (β-carbomethoxy-amido-ethyl)-benzenesulfonyl]-N'-isobutyl-urea (a) 2.5 grams of N-[4-(β-carbomethoxy-amido-ethyl)-benzenesulfonyl] - N' - isobutyl -thiourea [prepared by the reaction of 4-(β-carbomethoxy-amido-ethyl)-benzenesulfonamide with isobutyl mustard oil in acetone in the presence of potassium carbonate by boiling under reflux for 16 hours, melting point 96–98° C. (from isopropanol)] were dissolved in 60 milliliters of methanol. 2 grams of mercury oxide were added and the whole was stirred for 5 hours at 40° C. After cooling, the mercury sulfide formed was separated by filtration with suction and the filtrate was concentrated. The viscous resin which remained behind crystallized upon prolonged standing. The N - [4 - (β - carbomethoxy - amido-ethyl)-benzenesulfonyl-N'-isobutyl-isourea methyl ether thus obtained was found to melt at 79–81° C. (after recrystallization from dilute methanol).

(b) 10 milliliters of concentrated hydrochloric acid were poured over 1 gram of the isourea ether obtained according to (a). The whole was then heated for about 2 minutes on the steam bath. The greasy paste thus formed crystallized soon. After recrystallization from methanol, the N - [4 - (β - carbomethoxy-amido-ethyl)-benzenesulfonyl]-N'-isobutyl-urea was found to melt at 145–147° C.

(c) 1 gram of N - [4 - (β - carbomethoxy - amido-ethyl)-benzenesulfonyl] - N'-isobutyl-thiourea were dissolved in 10 milliliters of 1 N NaOH. After the addition of 2 milliliters of $H_2O_2$ (30%), the solution was heated for 3 minutes on the steam bath. After that, it was allowed to cool and diluted with 50 milliliters of water and acidified with hydrochloric acid. N-[4-(β-carbomethoxy-amido-ethyl)-benzenesulfonyl]-N'-isobutyl urea was obtained in crystalline form and, after recrystallization from methanol, was found to melt at 145–147° C.

EXAMPLE 4

N - [4 - (β - carbomethoxy - amido - ethyl) - benzenesulfonyl]-N'-β-phenylethyl-urea 11 grams of N - [4 - (β-carbomethoxy-amido-ethyl)-benzenesulfonyl] - N' - β-phenylethyl-thiourea [prepared from 4 - (carbomethoxy - amido - ethy1 )-benzenesulfonamide and β-phenylethyl mustard oil, melting point 122–124° C.] were dissolved in 100 milliliters of 1 N NaOH. After the addition of 5.4 grams of HgO, the whole was stirred for 4 hours, while heating to about 50° C. The solution was filtrated with suction, the filtrate was acidified with hydrochloric acid, filtrated with suction, dried, treated with ethyl acetate and the precipitate obtained, which constituted N-[4-β-carbomethoxy-amido-ethyl-benzenesulfonyl] - N' - β-phenylethyl-urea, was recrystallized from methanol (melting point 132–134° C.).

In a manner analogous to that of Example 3(c), there was obtained: from N - [4 - (β - carbomethoxy-amido-ethyl)-benzenesulfonyl] - N'-cyclooctyl-thiourea, melting point 132–134° C. (prepared from 4-(β-carbomethoxy-amido-ethyl)-benzenesulfonamide and cyclooctyl mustard oil) by treatment with $H_2O_2$ in alkaline solution, N - [4 - (β - carbomethoxyamido - ethyl) - benzenesulfonyl] - N'-cyclooctyl-urea, melting point 148–150° C. (from methanol).

We claim:
1. A compound of the formula:

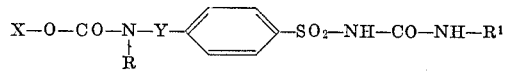

wherein:
R is hydrogen or lower alkyl,
$R^1$ is:
(a) alkyl or alkenyl having 2 to 8 carbon atoms,
(b) phenyl-lower alkyl,
(c) cyclohexyl-lower alkyl,
(d) lower alkylcyclohexyl, lower alkoxycyclohexyl, or
(e) cycloalkyl of 5 to 8 carbon atoms,
X is:

(a) alkyl of 1 to 8 carbon atoms or alkenyl of 2 to 8 carbon atoms, (b) phenyl-lower alkyl, lower alkyl-phenyl-lower alkyl of 1 to 6 alkyl carbon atoms, or mono- or dichlorophenyl-lower alkyl, or (c) cycloalkyl of 3 to 8 carbon atoms or a corresponding lower alkyl-cycloalkyl, Y represents a saturated hydrocarbon chain containing 1 to 4 carbon atoms, or a physiologically tolerable salt thereof.

2. N - [4 - ($\beta$ - {benzyloxycarbonamido} - ethyl) - benzenesulfonyl]-N'-cyclohexyl-urea or a physiologically tolerable salt thereof.

3. N - [4 - ($\beta$ - {methoxycarbonamido} - ethyl) - benzenesulfonyl]-N'-(4-methylcyclohexyl)-urea or a physiologically tolerable salt thereof.

4. N - [4 - ($\beta$ - {ethoxycarbonamido} - ethyl) - benzenesulfonyl]-N'-cyclohexyl-urea or a physiologically tolerable salt thereof.

5. N - [4 - ($\beta$ - {ethoxycarbonamido} - ethyl) - benzenesulfonyl]-N'-(4-methylcyclohexyl)-urea or a physiologically tolerable salt thereof.

6. N - [4 - ($\beta$ - {isobutoxycarbonamido} - ethyl) - benzenesulfonyl]-N'-(cyclohexylmethyl)-urea or a physiologically tolerable salt thereof.

7. N - [4 - ($\beta$ - {isobutoxycarbonamido} - ethyl) - benzenesulfonyl] - N' - (4 - methylcyclohexyl) - urea or a physiologically tolerable salt thereof.

8. N - [4 - ($\beta$ - {allyloxycarbonamido} - ethyl) - benzenesulfonyl]-N'-(4-methylcyclohexyl)-urea or a physiologically tolerable salt thereof.

9. N - [4 - ($\beta$ - {allyloxycarbonamido} - ethyl) - benzenesulfonyl]-N'-(4-ethylcyclohexyl)-urea or a physiologically tolerable salt thereof.

10. N - [4 - ($\beta$ - {cyclohexyloxycarbonamido} - ethyl)- benzenesulfonyl] - N' - (4 - methylcyclohexyl) - urea or a physiologically tolerable salt thereof.

11. N - [4 - ($\beta$ - {$\beta$ - phenylethoxycarbonamido}-ethyl)-benzenesulfonyl] - N' - cyclohexyl - urea or a physiologically tolerable salt thereof.

12. N - [4 - ($\beta$ - {4 - chlorobenzyloxycarbonamido}-ethyl) - benzenesulfonyl] - N' - (4 - methylcyclohexyl) - urea or a physiologically tolerable salt thereof.

13. N - [4 - ($\beta$ - {$\beta$ - chloroethoxycarbonamido}-ethyl)-benzenesulfonyl] - N' - (4 - methylcyclohexyl) - urea or a physiologically tolerable salt thereof.

14. N - [4 - ($\gamma$ - {ethoxycarbonamido} - propyl) - benzenesulfonyl]-N'-cyclohexyl-urea or a physiologically tolerable salt thereof.

15. N - [4 - ($\beta$ - {N - methyl - ethoxycarbonamido}-ethyl) - benzenesulfonyl] - N' - (4 - methylcyclohexyl)-urea or a physiologically tolerable salt thereof.

References Cited

UNITED STATES PATENTS 2,901,475    8/1959    Rudner et al.

FOREIGN PATENTS 1,373,366    8/1964    France.

OTHER REFERENCES

Momose et al., J. Pharm. Soc. Japan, vol. 81, p. 1046 (1961).

LORRAINE A. WEINBERGER, Primary Examiner

E. J. GLEIMAN, Assistant Examiner

U.S. Cl. X.R.

260—327, 345.8, 347.2, 553; 424—275, 283, 285, 300